No. 633,304.  
G. L. BRADSHAW.  
SAFETY PIN.  
(Application filed Feb. 25, 1899.)  
Patented Sept. 19, 1899.
(No Model.)
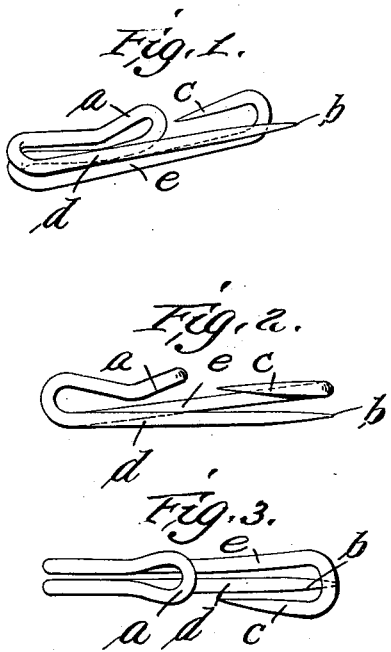
Attest  
Wm. F. Hall  
C. A. Middleton
Inventor  
Geo. L. Bradshaw  
by Miller Donaldson & Co  
Attys.

UNITED STATES PATENT OFFICE.

GEORGE L. BRADSHAW, OF QUINCY, ILLINOIS.

SAFETY-PIN.

SPECIFICATION forming part of Letters Patent No. 633,304, dated September 19, 1899.

Application filed February 25, 1899. Serial No. 706,851. (No model.)

*To all whom it may concern:*

Be it known that I, GEORGE L. BRADSHAW, a citizen of the United States, residing at Quincy, Adams county, Illinois, have invented certain new and useful Improvements in Safety-Pins, of which the following is a specification.

My invention relates to an improved hook and a pin bent out of a single piece of wire, having the points thereof so located as to prevent the accidental withdrawal of the device.

The invention is illustrated in the accompanying drawings, in which—

Figure 1 is a perspective view of the pin. Fig. 2 is an edge view thereof, and Fig. 3 is a face view of the same.

The pin is composed of a double wire, having the doubled end formed into a hook $a$ and the end of one leg $d$ of the pin extending perfectly straight from the bail of the hook and provided with a pointed end $b$. The other leg $c$ from the bail of the hook is extended straight to a point near the end of the leg $d$, where it is bent around parallel with the transverse axis of the hook $a$. This leg $c$ is deflected to bring the bent end thereof out of the vertical plane of the leg $d$ (viewing Fig. 2 from above) and in the vertical plane of the hook $a$. The bent-over portion of the leg $e$ is pointed and extends parallel with the leg $d$.

As viewed in Fig. 3, it will be seen that the main portion of the leg $c$ is to one side of the leg $d$, while the joint $c$ is upon the opposite side thereof.

In applying the pin the point $b$ is first inserted in the fabric and the leg $d$ pushed a little distance therein. Then the point $c$ is engaged with the fabric by moving the pin to slightly withdraw the leg $d$, and thus the point $c$ will be passed into the fabric, and said fabric will be thus engaged by points extending in diametrically opposite directions. Now if the pin moves in either direction it will be engaged more securely by one or the other of said points.

I claim—

1. A pin formed of a doubled wire having the doubled end thereof bent to form a hook and one leg of the pin extending straight from the bail of the hook and pointed at its end and the other leg of the pin being deflected toward the hook and bent back upon itself, said bent-over portion being pointed and resting parallel with the hook and out of the plane of the first leg.

2. A pin formed of doubled wire having a hook provided at the doubled end thereof, one leg of the pin extending straight from the bail of said hook and pointed at the end, the main portion of the other leg of the pin extending straight from the bail of the hook to a point near the end of the first leg and being deflected out of parallelism with the first leg, said second leg being bent around in a plane parallel with the transverse axis of the hook and pointed at its end, said pointed end being on the opposite side of the first leg to the main portion of the second leg.

3. A pin comprising the two legs, one of which has a point extending in one direction and the other having its end bent back over itself forming a point extending in a direction opposite to that of the first point, said legs being connected by a loop portion which is bent back over the leg portions to provide an engaging hook at the opposite end of the pin to the points, substantially as described.

In testimony whereof I affix my signature in presence of two witnesses.

GEORGE L. BRADSHAW.

Witnesses:
W. H. BENNETT,
GEO. W. JANNIN.